United States Patent Office 3,825,658
Patented July 23, 1974

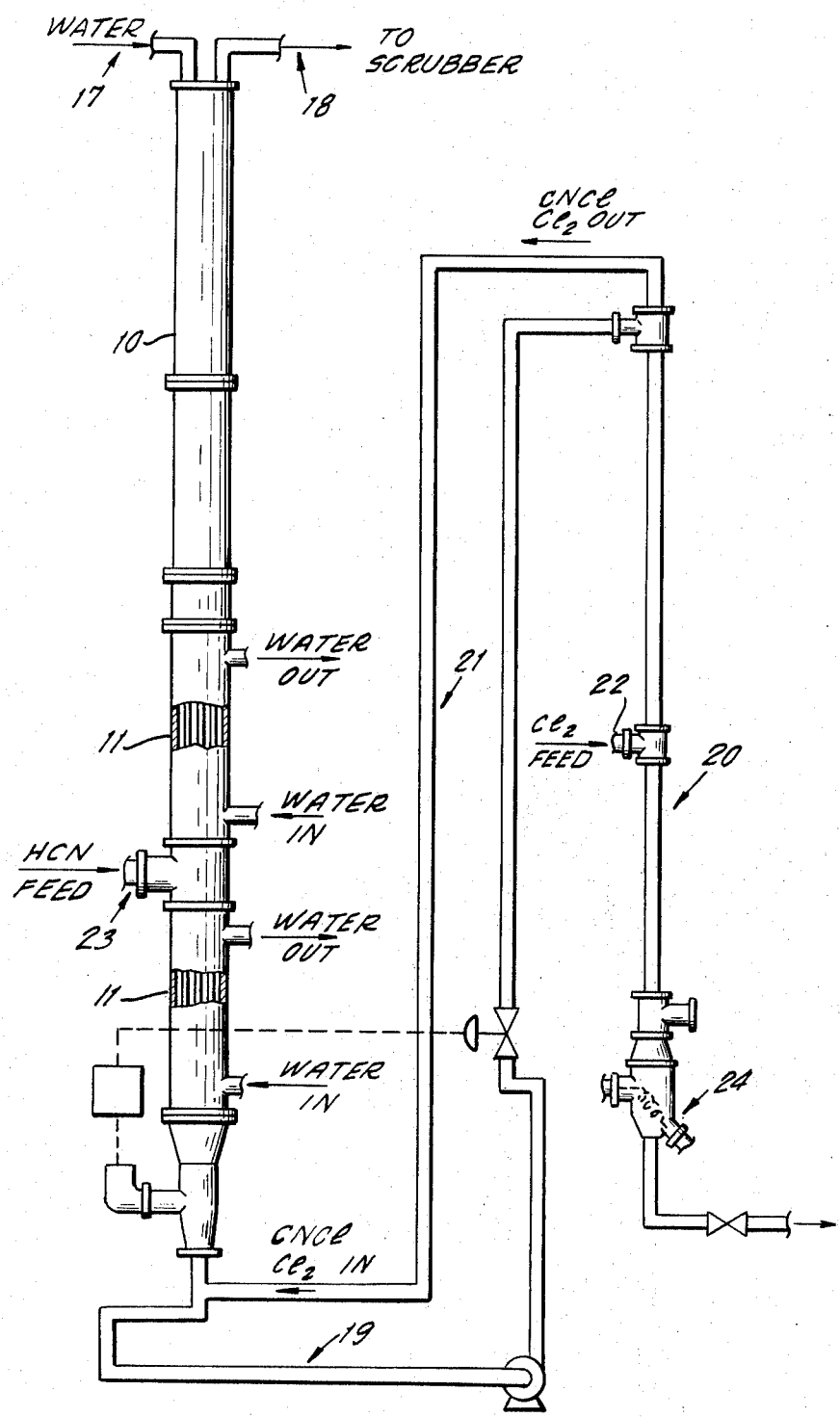

3,825,658
PROCESS FOR THE PREPARATION OF
CYANOGEN CHLORIDE
Robert John Eckert, Jr., and Roy Joseph Laran, Mobile, Ala., assignors to Ciba-Geigy Corporation, Greenburgh, N.Y.
Continuation-in-part of abandoned application Ser. No. 862,214, Sept. 30, 1969. This application Jan. 5, 1972, Ser. No. 215,645
Int. Cl. C01b 21/18
U.S. Cl. 423—383      2 Claims

ABSTRACT OF THE DISCLOSURE

An improved process is provided in the manufacture of cyanogen chloride involving the reaction of hydrogen cyanide and chlorine wherein the removal of cyanogen chloride is effected in the presence of about 1 to 3% hydrogen cyanide and at least 14% hydrogen chloride. This level of hydrogen cyanide minimizes or eliminates the formation of the undesirable nitrogen trichloride by-product.

RELATED APPLICATION

The present application is a continuation-in-part of Ser. No. 862,214, filed on Sept. 30, 1969, now abandoned.

FIELD OF INVENTION

The present invention relates to a new and improved procedure for preparing cyanogen chloride involving the reaction of hydrogen cyanide and chlorine wherein CNCl is removed in the presence of between about 1 and 3% hydrogen cyanide in a relatively concentrated by-product hydrogen chloride effluent. It has been found that a controlled level of hydrogen cyanide either eliminates or minimizes the formation of the undesirable by-product nitrogen trichloride. It is well known that nitrogen trichloride is a dangerous substance because of its explosive characteristics.

DESCRIPTION OF THE PRIOR ART

Cyanogen chloride is a valuable intermediate which is converted to cyanuric chloride, the latter compound being in turn, a useful chemical intermediate in the synthesis of known chemotherapeutic agents, herbicides, dyes, brightening agents, synthetic resins, plastics, rubbers, explosives and other materials.

Conventional procedures for producing cyanogen chloride involve reacting hydrogen cyanide and free chlorine, in accordance with the following equation:

I 
$$\text{HCN} + \text{Cl}_2 \rightarrow \text{CNCl} + \text{HCl}$$

It has been found that in the production of cyanogen chloride by the reaction indicated above, there is obtained, as an undesirable by-product, particularly in a strong acid medium, ammonium chloride resulting from the acid catalyzed hydrolysis of cyanogen chloride. This reaction is illustrated by the following equation:

II 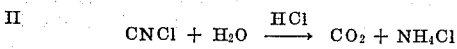
$$\text{CNCl} + \text{H}_2\text{O} \xrightarrow{\text{HCl}} \text{CO}_2 + \text{NH}_4\text{Cl}$$

There is the danger that the ammonium chloride thus formed may be and at times actually is converted, on chlorination thereof, to nitrogen trichloride (particularly in the stripping section of the apparatus described below), a highly dangerous substance because of its explosive characteristics.

DETAILED DESCRIPTION OF THE INVENTION

The present process is therefore directed to a procedure for minimizing or eliminating the chlorination of ammonium chloride whereby the formation of nitrogen trichloride in the stripping section of the apparatus is either avoided or minimized.

In the present process relatively concentrated by-product aqueous hydrogen chloride is obtained by controlling the amount of water introduced into the reactor column. The effluent aqueous hydrogen chloride will be at a concentration of about 14–15 to 25% by weight. While dilute by-product hydrochloric acid may be obtained by adjusting the amount of water fed into the column, the disposal of dilute acid is a problem when large amounts are produced. Since concentrated hydrochloric acid can be reused in other processes economically, it is a purpose of the present invention to obtain a relatively high concentration of hydrogen chloride. The rate of formation of undesirable ammonium chloride increases rapidly with increasing acid content with resulting greater potential for a higher level of $\text{NCl}_3$ produced in the stripping column. Therefore it becomes most desirable to eliminate or reduce the formation of nitrogen trichloride at the effluent acid levels disclosed herein.

In the production of cyanogen chloride, it is necessary to remove the desired product from the reaction medium which in the present case is an acid medium. This may be done in several ways. One suitable procedure involves reboiling the reaction medium containing the cyanogen chloride some chlorine and hydrogen cyanide. However, in the presence of a strong acid reaction medium, as indicated in Equation I, there is a relatively high degree of hydrolysis of cyanogen chloride at elevated temperatures as indicated in Equation II supra. Therefore, it is necessary to remove dissolved cyanogen chloride from the reaction medium under less drastic conditions.

A typical procedure for removing dissolved cyanogen chloride involves the use of countercurrent stripping with chlorine gas and a suitable apparatus as set out in the attached drawing wherein 10 represents an upper scrubbing column below which is a reaction section 11 consisting of two reactor heat exchangers. Opening into the center of the reactor heat exchanger is a hydrogen cyanide inlet 23. The scrubbing section is a packed tower which has a water inlet 17 and a gas outlet 18 at the top thereof through which water is fed into the scrubbing section 10. Gas produced within the reactors flows up through the scrubbing section. Connected to the lower reactor is an HCl line 19 which extends to a stripping column for recovering cyanogen chloride and chlorine from the reaction medium. The HCl solution containing CNCl and HCN at a concentration of at least 1% is pumped to the top of the stripping column 20. At the bottom of the lower reactor, is a chlorine line 21.

The lower reaction sections 11 are kept flooded with liquid reaction medium which is aqueous hydrochloric acid with hydrogen cyanide, chlorine and cyanogen chloride dissolved therein and also in gaseous form therein. Gaseous chlorine is fed into the chlorine inlet 22 in the middle of the stripping column 20, and hydrogen cyanide, preferably in liquid form, is fed into the middle of the lower reaction section through the hydrogen cyanide inlet 15. The amount of chlorine is in excess of that which is theoretically necessary to convert all of the hydrogen cyanide into cyanogen chloride. Water is fed into the top of the reaction and scrubbing column through the water inlet 17. The reaction is cooled with water to remove the heat of reaction.

Chlorine fed into the bottom of the lower reactor passes upwardly through the reaction medium therein, and reacts with the hydrogen cyanide fed into the middle of the lower reactor.

Gaseous cyanogen chloride will flow up through the scrubber section 10 where it is washed by the downflowing water to remove any hydrogen cyanide therein.

Gaseous cyanogen chloride together with any excess chlorine will flow out through the top. Aqueous hydrochloric acid saturated with cyanogen chloride will be pumped to the top of packed stripping column 20. The reaction medium will be stripped of cyanogen chloride. The thus stripped aqueous hydrochloric acid is removed from the bottom of the stripping column 20. The dissolved chlorine in the stripper liquid is then removed by reboiler 24. The level of the HCl is maintained at 14–15 to 25% by weight by control of the hydrogen cyanide and water feeds.

The temperature of the reaction scrubbing columns are normally maintained below about 50° C.

The present invention relates to an improvement in the preparation of cyanogen chloride involving the reaction of hydrogen cyanide and chlorine, said improvement comprising the removal of cyanogen chloride from the reaction medium in the presence of at least about 1% hydrogen cyanide by weight at a hydrogen chloride concentration of 14–15 to 25% by weight. By effecting the removal of the cyanogen chloride in the presence of at least about 1% hydrogen cyanide, there is a practically complete reaction of nitrogen trichloride if produced with the hydrogen cyanide. Any nitrogen trichloride formed in the stripping section of the apparatus is removed by the controlled reaction of the hydrogen cyanide in the liquid phase as shown in the following equation:

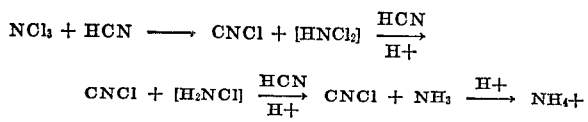

Quite unexpectedly, it has been found that in the presence of at least about 1% hydrogen cyanide and up to about 3% of this substance, the formation of the undesirable nitrogen trichloride is either completely eliminated or minimized. The hydrogen cyanide level should not exceed about 3% and suitably is between about 1 and 2%.

As previously mentioned the formation of ammonium chloride with its conversion on chlorination to nitrogen chloride is considered to be a significantly greater problem in the present invention employing relatively concentrated of by-product hydrogen chloride levels of 14–15 to 25%.

One manner of illustrating the problem between the hydrogen chloride effluent concentrations in the present disclosure as opposed to dilute acid is by cyanogen chloride hydrolysis data at different hydrogen chloride concentrations. The ease at which cyanogen chloride directly relates to its potential conversion on chlorination to nitrogen trichloride with its potentially explosive characteristics.

Cyanogen chloride hydrolysis kinetics may be found in the various publications including:

1. Lister, *Can. J. Chem.* 35 (1957), 736
2. Rabinovich, *Can. J. Chem.* 20B (1942), 221
3. Van Cleave, *Can. J. Chem.* 25B (1947)
4. Van Cleave, *Can. J. Chem.* 27B (1949)

Direct laboratory data in the present instance has showed the following hydrolysis data expressed in half life which is the time required for one half of the cyanogen chloride present to hydrolyze.

TABLE

Half life (min.) CNCl

| Temperature | 30° C. | 50° C. | 100° C. |
|---|---|---|---|
| Percent HCl: | | | |
| 15 | 1.3×10³ | 500 | 300 |
| | 89 | 4.0 | 0.77 |
| 20 | 29 | 0.40 | 0.06 |

The above table is considered to illustrate that in dilute concentrations of HCl, e.g. 3% by weight, the hydrolysis of cyanogen chloride is relatively slow. Therefore the levels of ammonium chloride and nitrogen chloride are very low. In contrast at the employed concentrations of aqueous hydrogen chloride, the hydrolysis of cyanogen chloride occurs in a rapid manner and the formation of nitrogen trichloride likewise can proceed rapidly. Therefore the reduction or elimination of undesirably by-product nitrogen trichloride is considered to be highly desirable at the hydrogen chloride levels of 14–15 to 25%.

The following example serves to illustrate the invention and is therefore not to be considered as limiting.

EXAMPLE

A series of runs were conducted in the stripping column where the feed to the column contained 0.12 to 0.30% hydrogen cyanide by weight. In those cases over an extended time period, the overhead gas stream at the top of the stripping column averaged 0.18 to 0.50 mole percent nitrogen trichloride at the 14% by weight HCl level fed to the stripper.

However, when the hydrogen cyanide level is increased to 1–2% by weight by controlling the temperature hydrogen cyanide throughput and Cl₂ gas-liquid contact in the reactor column, the following unexpected results were obtained and are shown in the following table.

TABLE

| Feed to top of stripper column | | | Mole percent NCl₃ in stripper column gas stream | |
|---|---|---|---|---|
| Percent HCl (by weight) | NH₄Cl (by weight) | Percent HCN | Top | Middle |
| 14.1 | ¹ 0.166 | 1.12 | ND ² | 0.16 |
| 14.7 | 0.166 | 1.02 | ND | 0.15 |
| 14.3 | 0.166 | 1.16 | ND | 0.52 |
| 14.2 | 0.166 | 0.98 | ND | 0.19 |
| 14.0 | 0.166 | 1.12 | ND | 0.11 |
| 20.0 | 0.336 | 0.90 | ND | |
| 20.6 | 0.393 | 1.40 | Tr ³ | |
| 20.8 | 0.390 | 1.90 | Tr | |

¹ Based on Kjeldahl analysis in effluent leaving column.
² Not detectable or less than 0.01%.
³ Trace.

The results set out above clearly indicate that the amount of NCl₃ present in the middle of the stripper column is substantially minimized in the presence of HCN. The amounts of NCl₃ noted at the top of the stripper column were either not detectable or present at most in trace quantities.

It will thus be seen that the present invention provides an improved process for the production of cyanogen chloride whereby the production of the by-product nitrogen trichloride is either minimized or eliminated. It will be understood however that various changes may be made in the preferred embodiment of the process, as described hereinabove. Accordingly, the preceding description is intended as illustrative only and should not be considered in a limiting sense.

What is claimed is:

1. In a process for the preparation of cyanogen chloride by a procedure involving reaction of hydrogen cyanide with chlorine in the presence of water with formation of by-product hydrogen chloride at a concentration of about 14 to 25% by weight, the improvement which comprises removing to a stripping column the cyanogen chloride and hydrogen chloride together with about 1% to 3% by weight of hydrogen cyanide and passing chlorine through said stripping column, thereby causing the nitrogen trichloride formed to react with the hydrogen cyanide.

2. A process according to claim 1 wherein the removal of cyanogen chloride is effected in the presence of between about 1% and 2% hydrogen cyanide.

References Cited

UNITED STATES PATENTS

| | | | |
|---|---|---|---|
| 3,499,737 | 3/1970 | Durrell et al. | 423—379 |
| 3,681,034 | 8/1972 | Evers | 423—379 X |
| 3,567,406 | 3/1971 | Evers | 423—379 |
| 3,535,091 | 10/1970 | Trickey | 423—379 |
| 3,499,738 | 3/1970 | Evers | 423—379 |

BENJAMIN R. PADGETT, Primary Examiner

R. L. TATE, Assistant Examiner

U.S. Cl. X.R.

423—371, 379